3,333,968
COATINGS FOR ICE CREAM AND FROZEN DESSERTS AND PROCESS OF MANUFACTURE THEREOF
Richard J. Bell and Robert L. Campbell, Jr., Sherman, Tex., assignors to Anderson Clayton & Co., Houston, Tex., a corporation of Delaware
No Drawing. Filed Mar. 23, 1966, Ser. No. 536,647
28 Claims. (Cl. 99—166)

ABSTRACT OF THE DISCLOSURE

Coatings for ice cream and frozen desserts made by mixing (i) a fat having a non-directed non-lauric oil or mixture of up to about 40% lauric oil with non-directed non-lauric oil, the non-directed non-lauric oils having been selectively hydrogenated under conditions converting in excess of approximately ⅔ of linoleic and linolenic acid radicals to elaidic acid radicals and resulting in not more than approximately 4% by weight stearic acid radicals in the total lauric and non-directed non-lauric oils and (ii) other compatible conventional ice cream and frozen dessert coating ingredients.

---

This is a continuation-in-part of United States patent application No. 225,146, filed Sept. 20, 1962, and entitled, "Coatings for Ice Cream and Frozen Desserts and Process of Manufacture Thereof," which in turn is a continuation-in-part of United States patent application No. 139,616, filed Sept. 21, 1961, and entitled, "Fat for Use in Coating Ice Cream and Frozen Desserts and Process of Manufacture Thereof," both now abandoned.

"Ice cream" is a term applied herein and in the art only to an all dairy product. The term "frozen dessert" when used herein means a food product sold in a frozen condition which contains vegetable or animal fats. An example is mellorine.

Ice cream and frozen desserts are often sold with a coating, principally chocolate flavored, which coating normally includes a fat, cocoa powder, nonfat dry milk powder, sugar and lecithin. These coatings to be desirable in eating must melt readily in the mouth, must not leave a fatty residue in the mouth, must not have a waxy feel, and must not mask the chocolate or other flavor. The production of coated ice cream and frozen dessert products is often by automatic machinery and as a result there are certain standards for drying, hardening, and brittleness times in addition to desired viscosity of the liquid coating and thickness of the coating film on the product. It is commonly required that the coating dry on the ice cream or frozen dessert in approximately 11 to 12 seconds so that it will not drip, that it be hardened to a point where it will not score in approximately 49 to 52 seconds after dipping, and that it become brittle to where it will "snap" in approximately 60 seconds after dipping. The viscosity desired is approximately 32° MacMichael and a typical thickness of film desired is to cover 50 normal size ice cream bars per pound of coating.

The fat used in the coating has a very marked influence on the production characteristics and controls the eating characteristics. It has been common to use a pure lauric oil, especially coconut, for the fat in the coating as it gives a coating having excellent eating and production characteristics. Because of the cost of coconut oil and other lauric oils is quite high, efforts have been made to obtain a coating as acceptable as having an all coconut oil fat by using a fat which is a mixture of lauric oils and partially or completely hydrogenated non-lauric oils. In actual practice the accepted fat used in coatings for ice cream and frozen desserts has a minimum of approximately 75% coconut oil with the remainder being non-lauric oils. These fats containing less than 100 percent coconut oil are not as satisfactory as all coconut oil fat but have been used because of the saving in cost.

It is a general object of the present invention to provide coatings and process of manufacture thereof for ice cream and frozen desserts which coatings have excellent eating and production qualities.

It is a still further object of the present invention to provide such coatings utilizing a minimum amount of coconut or other lauric oil.

These and other objects will be apparent from the following description of the invention.

In the foregoing and in the remainder of this specification, the term "lauric oil" means an edible oil such as coconut, palm kernel, babassu, and coquito whose principal fatty acid constituent is lauric acid, which is a saturated acid. The remaining fatty acid content contains very little unsaturation.

The term "non-lauric" oil means those edible oils whose principal fatty acid content is not lauric acid and which contain substantial amounts of linoleic and/or linolenic fatty acid radicals. Other unsaturated acid radicals such as oleic are normally present but are not required to be for this invention. The bulk of the fatty acid radicals other than linoleic, linolenic, and oleic in non-lauric oils is normally saturated acid radicals. Examples of non-lauric oils include the domestic vegetable oils such as cottonseed oil, peanut oil, soybean oil, palm oil, sesame oil, safflower oil, and sunflower oil.

The term "non-directed non-lauric" oil means non-lauric oils having their fatty acid radicals distributed in the triglyceride molecules of the oil in a no more directed arrangement than occurs in such oils in nature. Non-directed non-lauric oil thus includes non-lauric oils which have not been treated to alter the fatty acid radical distribution and also oils in which the molecular structure has been subjected to random rearrangement of the fatty acid radicals in the triglyceride molecules (hereinafter called "random rearrangement") in a manner well known in the art. It does not include those non-lauric oils which have been subjected to the directed rearrangement of the fatty acid radicals in the triglyceride molecules which is also well known in the art.

The present invention is based upon the discovery that if a non-directed non-lauric oil is subjected to selective hydrogenation under conditions converting in excess of approximately ⅔ of the linoleic and linolenic acid radicals to elaidic acid radicals with minimum formation of stearic acid radicals and this treated non-directed non-lauric oil, either alone or in a blend with lauric oil (the amount of lauric oil in the blend being up to about 40% of the total lauric and non-directed non-lauric oils) is mixed as the fat ingredient with compatible other conventional ice cream and frozen dessert coating ingredients an excellent coating results. This selective hydrogenation may be carried out either before or after the blending of the oils.

"Minimum formation of stearic acid radicals" as that expression is used herein means that the total stearic acid radical content in the non-directed non-lauric oil is not more than approximately 4% by weight of the blend of lauric and non-directed non-lauric oil. When the stearic acid content is greater than approximately 4% the finished coating has an undesirable waxy feel and the chocolate flavor is masked.

Normal oleic acid is the cis geometric isomer of oleic acid as this is the geometric form in which oleic acid occurs in nature. The transgeometric isomer of oleic acid is commonly known as elaidic acid. Elaidic acid is formed by the hydrogenation of linoleic and/or linolenic acid but hydrogenation of oleic acid forms stearic rather than elaidic acid.

In the previous known methods of preparation of coatings for ice cream and frozen desserts there has been partial hydrogenation of the non-directed non-lauric oil and necessarily a conversion of some of the linoleic and/or linolenic acid radicals to elaidic acid radicals. However, we have discovered that if the hydrogenation is selective so that it converts in excess of approximately ⅔ of the linoleic and/or linolenic acid radicals to elaidic acid radicals with the minimum formation of stearic acid radicals and that oil or blend of oils is mixed as the fat constituent with compatible conventional ice cream and frozen dessert ingredients that an excellent coating results even with little if any lauric acid oil being used.

Cocoa powder is commonly used in ice cream and frozen dessert coatings but occasionally chocolate will be used rather than cocoa powder. Chocolate is the only known conventional ice cream and frozen dessert ingredient used with fats that is not compatible with the fat of the present invention. It is the cocoa butter of the chocolate that causes incompatibility. As a result of this incompatibility, if there is present in the finished coating cocoa butter in excess of approximately 10% by weight of the finished coating, then the finished coating has excessive hardening, drying and brittleness times.

Set forth hereafter are examples of coatings including different mixtures of lauric and non-lauric and of non-directed non-lauric coil alone used as fat in coatings showing (a) the brittleness time, hardening time, and drying time of coatings for ice cream and frozen desserts where at least the non-directed non-lauric constituent of the fat has been hydrogenated under conditions converting in excess of approximately ⅔ of the linoleic and linolenic acid radicals to elaidic acid radicals, (b) the effect of improper hydrogenation causing insufficient conversion to elaidic acid radicals, and (c) the effect of excessive hydrogenation where substantial amounts of elaidic and oleic acid radicals are converted to stearic acid radicals.

In the following examples two types of coatings for ice cream and frozen desserts were used. Type I coating consisted of 57% fat, 42.7% 10X confectioner's sugar (the dry ingredient) and 0.3% lecithin. Type II coating consisted of 57.0% fat, 42.7% dry ingredients (said dry ingredients being 11.61% cocoa, 11.61% non-fat dry milk, 76.51% sugar, and 0.27% vanilla and salt) and 0.3% lecithin. The coating in each instance was prepared by sifting and weighing the dry ingredients, weighing the fat melted at 125 plus or minus 5 degrees Fahrenheit, adding lecithin to the fat, making a paste with the dry ingredients and approximately ⅓ of the melted fat, adding the remaining fat and mixing thoroughly, and holding the coating at the coating temperature of 105 plus or minus 1 degree Fahrenheit for at least 30 minutes before using.

The product coated was ice cream bars which had been stored at −20° Fahrenheit for not less than 12 nor more than 24 hours. In coating the bars the bars were dipped into the liquid coating and allowed to remain for not more than 2 to 3 seconds. The bars were then removed from the coating and held until dripping of the coating from the bar stopped about which time a gloss or sheen appeared on the coated bar. The time in seconds from the removal of the bar from the coating until the gloss or sheen appeared after the dripping stopped is the "drying time." Immediately after the coating dried the coating was scratched with the sharp corner of a rectangular piece of hard plastic using about 2-inch strokes and moderate pressure. When the plastic piece stopped digging through the coating and started to make fine shavings the coating was considered hardened and the time elapsed from the time the bar was removed from the liquid coating until the shavings appeared is the "hardening time." After the bars had hardened they were bitten at regular intervals until the coatings audibly snapped. The total elapsed time between the removal of the bars from the liquid coating until the coating snapped is the "brittleness time."

Example 1

In this example the fat consisted of various percentages of coconut oil and hydrogenated soybean oil prepared in the following manner. Soybean oil which has not been subjected to random rearrangement was refined and bleached in the conventional manner and then placed in conventional hydrogenation equipment where it was hydrogenated at 400° plus or minus 10 degrees Fahrenheit at 15 p.s.i.g. pressure under hydrogen gas with 0.10% partially deactivated nickle catalyst while the oil was being mildly agitated until the oil reached an end point of a melting point of 35.8° centrigrade Wiley. The hydrogenation was stopped, the catalyst removed by filtration, and the soybean oil deodorized. This selective hydrogenation of the soybean oil resulted in no appreciable increase in stearic acid content. It was about 4% both before and after hydrogenation. After this selective hydrogenation the soybean oil had a 55.5% elaidic acid content which was a conversion of approximately 95% of the linolenic and linoleic acid content to elaidic acid.

When it is desired to selectively hydrogenate non-directed non-lauric oils to convert in excess of approximately ⅔ of the linoleic and linolenic acid radicals to elaidic acid radicals with a minimum formation of stearic acid radicals several processes are well known in the art and no further description of this selective hydrogenation is necessary.

The treated soybean oil, last mentioned, was blended in different amounts with deodorized coconut oil at approximately 125° Fahrenheit. The stearic acid content of the coconut oil was about 2.5%. The treated soybean oil, the coconut oil, and mixture of this selectively treated soybean oil and coconut oil were made into type II coating and the coating subjected to tests for drying, hardness, and brittleness time with the following results:

| Coconut Oil, Percent | Soybean Oil, Percent | Drying Time in Seconds | Hardening Time in Seconds | Brittleness Time in Sec. |
|---|---|---|---|---|
| 100 | 0 | 11 | 32 | 54 |
| 90 | 10 | 13 | 39 | 67 |
| 80 | 20 | 14 | 49 | 78 |
| 70 | 30 | 13 | 50 | 88 |
| 60 | 40 | 13 | 48 | 116 |
| 50 | 50 | 13 | 34 | 133 |
| 40 | 60 | 13 | 34 | 98 |
| 30 | 70 | 11 | 29 | 51 |
| 25 | 75 | 11 | 25 | 38 |
| 20 | 80 | 13 | 20 | 34 |
| 10 | 90 | 12 | 21 | 42 |
| 0 | 100 | 12 | 26 | 46 |

All of these coatings had good eating qualities, proper viscosity, and proper thickness of film. These tests show that with pure coconut oil as the fat in the coating there was an acceptable coating but as the percentage of coconut oil decreased the brittleness time increased sharply until approximately 50% coconut oil was reached. This is the same difficulty encountered by others in this field in attempting to reduce the percentage of coconut oil in the fat used in the coating. However, it was discovered there unexpectedly results a sharp decrease in the brittleness time when the fat is made in accordance with the present process after the amount of coconut oil had been reduced below 50% and when the coconut oil reached as low as approximately 40% the brittleness time began to be satisfactory and continued to be satisfactory on further reductions of coconut oil, even to the point of a fat having no coconut oil. At approximately 30% coconut oil and below the brittleness time and hardening time both are better (shorter) than for pure coconut oil which has previously been considered to be the most desirable fat. Between 20% and 25% coconut oil mixture gave the best performance and this is the best mode contemplated by the applicants.

Example 2

With blends of the same percentages of the same coconut oil and soybean oil which have not been selectively hydrogenated to convert approximately 2/3 of the linoleic and linolenic acid radicals to elaidic acid radicals there is a marked increase in brittleness time. For example, the same soybean oil used in Example 1 was moderately selectively hydrogenated at 330 plus or minus 10 degrees F. under hydrogen gas at 20 p.s.i.g. with 0.02% new active nickle catalyst under agitation until approximately the same end point of 35.6° centigrade Wiley melting point was reached. This resulted in a soybean oil having a total elaidic acid content of 31.8% or approximately 55% conversion of linolenic and linoleic to elaidic. With this moderately selective hydrogenated soybean oil a mixture of 75% of it and 25% coconut oil gave a brittleness time of 102 seconds as compared to 38 seconds where the elaidic acid conversion was approximately 95%.

Example 3

If soybean oil is hydrogenated under conditions converting in excess of approximately 2/3 of the linoleic and linolenic acid radicals to elaidic acid radicals but the hydrogenation is continued to where it results in the formation of more than approximately 4% by weight of stearic acid radicals in the total lauric and non-directed non-lauric oils, the production characteristics of drying time, hardening time, and brittleness time will not be too adversely affected but the eating qualities decrease severely, especially with the increase of a waxy feel in the mount and a waxy residue in the mouth after eating. As an illustration the soybean oil of Example 1 was hydrogenated past 100% conversion of the linoleic and linolenic acid radicals to elaidic acid radicals. As a result, some of the elaidic acid radicals were converted to stearic acid radicals so the percent conversion was 99 rather than 100. The resulting stearic acid content was approximately 7% of the soybean oil. A blend was made of 75% of this treated soybean oil and 25% unhardened coconut oil resulting in a stearic acid content of the blend of approximately 5%. This blend when used as a fat in the type II coating had excellent drying, hardness, and brittleness times of 13, 25, and 38 seconds respectively, but the finished coating had a waxy feel and aftertaste, the chocolate flavor was masked, and the viscosity of the coating was so great that the hardened coating was thicker than desirable for either eating or production characteristics.

Example 4

In this example the fat was prepared in the same way as in Example 1 but the finished coating is the type I coating rather than type II coating used in Example 1. This type 1 coating was subjected to the test for drying, hardness, and brittleness time with the following results:

| Coconut Oil, Percent | Soybean Oil, Percent | Drying Time in Seconds | Hardening Time in Seconds | Brittleness Time in Sec. |
|---|---|---|---|---|
| 100 | 0 | 15 | 39 | 70 |
| 90 | 10 | 15 | 62 | 92 |
| 80 | 20 | 15 | 64 | 110 |
| 70 | 30 | 16 | 65 | 118 |
| 60 | 40 | 15 | 54 | 154 |
| 50 | 50 | 14 | 38 | 165 |
| 40 | 60 | 14 | 34 | 116 |
| 30 | 70 | 13 | 31 | 45 |
| 20 | 80 | 14 | 24 | 37 |
| 10 | 90 | 15 | 20 | 31 |
| 0 | 100 | 16 | 20 | 38 |

Here, again, all of these coatings had good eating qualities, proper viscosity, and proper thickness of films. With pure coconut oil as the fat in the coating there was an acceptable coating but as the percentage of the coconut oil decreased the brittleness time increased until approximately 50% coconut oil was reached. There was a sharp decrease in brittleness time after the amount of coconut oil was reduced below about 40% and when the coconut oil reached as low as approximately 35% the brittleness time began to be satisfactory and continued to be satisfactory on further reduction of coconut oil even to the point of the fat having no coconut oil. At approximately 30% coconut oil and below the brittleness time and hardening time both were better (shorter) than for pure coconut oil. 10% coconut oil mixture gave the best performance.

In the specific examples heretofore given the non-directed non-lauric oil has been oil in which the fatty acid radicals are distributed in the triglyceride molecules of the oil as such distribution occurs in nature. However, the process and product of the present development may be carried out using a non-directed non-lauric oil which has been subjected to random rearrangement. An example of such random rearrangement is subjecting soybean oil in the liquid phase at 180° F. in the presence of 0.4% sodium methylate catalyst at atmospheric pressure for 60 minutes. When it is desired to effect random rearrangement of a non-lauric oil, several processes are well known in the art and no further description of such random rearrangement is necessary.

Other lauric oils than coconut oil, other non-directed non-lauric oils than soybean, and combinations thereof when used in accordance with the present invention result in coatings for ice cream and frozen desserts which have excellent eating and production qualities and which require a minimum amount of lauric oil.

From the foregoing discussions, examples, and description of the invention it is apparent that the objects set forth herein as well as others have been achieved. Those skilled in the art will recognize that the principles of this invention may be applied in several ways, only a few of which have been exemplified herein specifically. Accordingly, the invention is to be limited only by the spirit thereof and the scope of the appended claims.

What is claimed is:

1. In the process of preparing a coating for ice cream and frozen desserts, the improvement comprising the steps of:
    (a) preparing the coating fat ingredient of such coating by
        (i) mixing at least one lauric oil with at least one non-directed non-lauric oil, said lauric oil being up to about 40% by weight of the total lauric and non-directed non-lauric oils in said mixture, said non-directed non-lauric oil containing acid radicals selected from a group consisting of linoleic and linolenic acid radicals,
        (ii) selectively hydrogenating at least the non-directed non-lauric oil of the fat under conditions converting in excess of approximately 2/3 of the linoleic and linolenic acid radicals to elaidic acid radicals and resulting in not more than approximately 4% by weight stearic acid radicals in the total lauric and non-directed non-lauric oils in the fat, said steps (i) and (ii) being carried out in either order, and
    (b) mixing the fat with other compatible conventional ice cream and frozen dessert coating ingredients.

2. The process of claim 1 in which the non-directed non-lauric oil has its fatty acid radicals distributed in triglyceride molecules of the oil as such distribution naturally occurs in such oil.

3. The process of claim 1 in which the non-directed non-lauric oil is soybean oil.

4. The process of claim 1 in which the compatible conventional ice cream and frozen dessert coating ingredients are free from more than approximately 10% cocoa butter.

5. The process of claim 1 in which the non-directed non-lauric oil is soybean oil and the lauric oil is coconut oil and the coconut oil constitutes about 20% by weight of the total lauric and non-directed non-lauric oil.

6. The process of claim 5 in which the soybean oil has its fatty acid radicals distributed in triglyceride molecules of the oil as such distribution naturally occurs in such oil.

7. In the process of preparing a coating for ice cream and frozen desserts, the improvement comprising the steps of:
   (a) preparing the coating fat ingredient of such coating by selectively hydrogenating at least one non-directed non-lauric oil, said non-directed non-lauric oil containing acid radicals selected from a group consisting of linoleic and linolenic acid radicals, under conditions converting in excess of approximately ⅔ of the linoleic and linolenic acid radicals to elaidic acid radicals and resulting in not more than approximately 4% by weight stearic acid radicals in the total non-directed non-lauric oil in the fat, and
   (b) mixing the fat with other compatible conventional ice cream and frozen dessert coating ingredients.

8. The process of claim 7 in which the non-directed non-lauric oil has its fatty acid radicals distributed in triglyceride molecules of the oil as such distribution naturally occurs in such oil.

9. The process of claim 7 in which the compatible conventional ice cream and frozen dessert coating ingredients are free from more than approximately 10% cocoa butter.

10. The process of claim 7 in which the non-directed non-lauric oil is soybean oil.

11. The process of claim 10 in which the soybean oil has its fatty acid radicals distributed in triglyceride molecules of the oil as such distribution naturally occurs in such oil.

12. In the process of preparing a coating for ice cream and frozen desserts the improvement comprising mixing
   (a) compatible conventional ice cream and frozen dessert coating ingredients and
   (b) a blend of oils as the fat constituent of such coating, the blend comprising at least one lauric oil and at least one non-directed non-lauric oil, said lauric oil being up to about 40% by weight of the total lauric oil and non-directed non-lauric oil in said mixture, said non-directed non-lauric oil containing acid radicals selected from a group consisting of linoleic and linolenic acid radicals and said blend having at least the non-directed non-lauric oil hydrogenated under conditions converting in excess of approximately ⅔ of the linoleic and linolenic acid radicals to elaidic acid radicals and resulting in not more than approximately 4% by weight of stearic acid radicals in the total lauric and non-directed non-lauric oils in the blend.

13. The process of claim 12 in which the non-directed non-lauric oil has its fatty acid radicals distributed in triglyceride molecules of the oil as such distribution naturally occurs in such oil.

14. The process of claim 12 in which the compatible conventional ice cream and frozen dessert ingredients are free from more than approximately 10% cocoa butter.

15. The process of claim 12 in which the non-directed non-lauric oil is soybean oil and the lauric oil is coconut oil and the coconut oil constitutes about 20% by weight of the total lauric and non-directed non-lauric oil.

16. The process of claim 13 in which the non-directed non-lauric oil is soybean oil.

17. The process of claim 15 in which the soybean oil has its fatty acid radicals distributed in triglyceride molecules of the oil as such distribution naturally occurs in such oil.

18. In the process of preparing a coating for ice cream and frozen desserts the improvement comprising the steps of
   (a) preparing the coating fat ingredient of such coating by selectively hydrogenating a non-directed non-lauric oil containing acid radicals selected from a group consisting of linoleic and linolenic acid radicals under conditions converting in excess of approximately ⅔ of the linoleic and linolenic acid radicals to elaidic acid radicals and resulting in not more than approximately 4% by weight stearic acid radicals and
   (b) mixing said coating fat with other compatible conventional ice cream and frozen dessert coating ingredients.

19. The process of claim 18 in which the non-directed non-lauric oil has its fatty acid radicals distributed in triglyceride molecules of the oil as such distribution naturally occurs in such oil.

20. The process of claim 19 in which the non-directed non-lauric oil is soybean oil.

21. A coating for ice cream and frozen desserts comprising:
   (a) a fat ingredient including a mixture of at least one lauric and at least one non-directed non-lauric edible oil in which mixture there is up to about 40% by weight lauric oil of the total lauric and non-directed non-lauric oil and in which at least the non-directed non-lauric oil has been treated under conditions converting in excess of approximately ⅔ of the acid radicals selected from the group consisting of linoleic and linolenic acid radicals to elaidic acid radicals and resulting in the formation of not more than approximately 4% by weight stearic acid radicals in the total lauric and non-directed non-lauric oils and
   (b) other compatible conventional ice cream and frozen dessert coating ingredients.

22. The coating of claim 21 in which the non-directed non-lauric oil has its fatty acid radicals distributed in triglyceride molecules of the oil as such distribution naturally occurs in such oil.

23. The coating of claim 22 in which the non-directed non-lauric oil is soybean oil.

24. The coating of claim 21 in which the non-directed non-lauric oil is soybean oil having its fatty acid radicals distributed in triglyceride molecules of the oil as such distribution naturally occurs in such oil and the lauric oil is coconut oil.

25. A coating for ice cream and frozen desserts comprising:
   (a) a fat ingredient including at least one non-directed non-lauric edible oil which has been treated under conditions converting in excess of approximately ⅔ of the acid radicals selected from the group consisting of linoleic and linolenic acid radicals to elaidic acid radicals and resulting in the formation of not more than approximately 4% by weight stearic acid radicals in the non-directed non-lauric oil and
   (b) other compatible conventional ice cream and frozen dessert coating ingredients.

26. The coating of claim 25 in which the non-directed non-lauric oil has its fatty acid radicals distributed in triglyceride molecules of the oil as such distribution naturally occurs.

27. The coating of claim 26 in which the non-directed non-lauric oil is soybean oil.

28. The coating of claim 25 in which the non-directed non-lauric oil is soybean oil.

References Cited
UNITED STATES PATENTS
2,136,653  11/1938  Moore et al. _____ 99—118
3,198,816   8/1965  Zajcew _____ 260—409

OTHER REFERENCES
Bailey, A. E.: "Industrial Oil and Fat Products," Interscience Pub. Inc., New York, 1951, pp. 152, 759, 760.

Feuge, R. O.: "Production of Specialty Edible Fats," October 1960, pp. 1 to 6, page 2 relied on.

A. LOUIS MONACELL, *Primary Examiner.*

M. W. GREENSTEIN, *Assistant Examiner.*